(12) United States Patent
Wang et al.

(10) Patent No.: US 11,102,186 B2
(45) Date of Patent: Aug. 24, 2021

(54) PACKET CAPTURE IN SOFTWARE-DEFINED NETWORKING (SDN) ENVIRONMENTS

(71) Applicant: VMware, Inc., Palo Alto, CA (US)

(72) Inventors: Yong Wang, Palo Alto, CA (US); Xinhua Hong, Palo Alto, CA (US); Kai-Wei Fan, Palo Alto, CA (US)

(73) Assignee: VMWARE, INC., Palo Alto, CA (US)

(*) Notice: Subject to any disclaimer, the term of this patent is extended or adjusted under 35 U.S.C. 154(b) by 351 days.

(21) Appl. No.: 15/963,187

(22) Filed: Apr. 26, 2018

(65) Prior Publication Data
US 2019/0334880 A1    Oct. 31, 2019

(51) Int. Cl.
*H04L 29/06* (2006.01)
*H04L 12/24* (2006.01)

(52) U.S. Cl.
CPC .......... *H04L 63/0471* (2013.01); *H04L 41/20* (2013.01); *H04L 63/20* (2013.01); *H04L 41/0893* (2013.01); *H04L 41/142* (2013.01)

(58) Field of Classification Search
CPC ..... H04L 63/0471; H04L 41/20; H04L 63/20; H04L 41/0893; H04L 41/142
See application file for complete search history.

(56) References Cited

U.S. PATENT DOCUMENTS

| | | | |
|---|---|---|---|
| 9,264,400 B1* | 2/2016 | Lin | H04L 49/35 |
| 2010/0043068 A1* | 2/2010 | Varadhan | H04L 45/60 726/15 |
| 2010/0191958 A1* | 7/2010 | Chen | H04L 63/0464 713/153 |
| 2013/0332983 A1* | 12/2013 | Koorevaar | H04L 45/306 726/1 |
| 2016/0352576 A1* | 12/2016 | Mekkattuparamban | H04L 41/0893 |
| 2017/0104851 A1* | 4/2017 | Arangasamy | H04L 63/0428 |
| 2018/0083837 A1* | 3/2018 | Teng | H04L 41/0893 |
| 2018/0287905 A1* | 10/2018 | Mehta | H04L 12/4641 |
| 2019/0020684 A1* | 1/2019 | Qian | H04L 63/164 |
| 2019/0230126 A1* | 7/2019 | Kumar | H04L 45/74 |
| 2019/0312820 A1* | 10/2019 | Yu | H04L 47/36 |

* cited by examiner

*Primary Examiner* — Chau Le
*Assistant Examiner* — Andrew Suh
(74) *Attorney, Agent, or Firm* — Su IP Consulting

(57) ABSTRACT

Example methods are provided for a network device to perform packet capture in a software-defined networking (SDN) environment. One example method may comprise detecting an egress packet that includes an inner header addressed from a first node to a second node; and identifying a security policy applicable to the egress packet by comparing one or more fields in the inner header with one or more match fields specified by the security policy. The method may further comprise: based on the security policy, capturing the egress packet in an unencrypted form; performing encryption on the egress packet to generate an encrypted packet that includes the egress packet in an encrypted form; and sending the encrypted packet to the second node.

21 Claims, 8 Drawing Sheets

*Examples
(1) Tunnel mode:  H = Outer header (O)   Encrypted payload (EP)

| IP header | ESP header | IV | GRE header | I | P | ESP trailer | ESP Auth |

(2) Transport mode:  H = Inner header (I)   Encrypted payload (EP)

| I | IV | ESP header | P | ESP trailer | ESP Auth |

PACKET CAPTURE IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. Further, through SDN, benefits similar to server virtualization may be derived for networking services. For example, logical overlay networks may be provisioned, changed, stored, deleted and restored programmatically without having to reconfigure the underlying physical hardware architecture. In practice, users (e.g., network administrators, security engineers) may wish to capture packets in the SDN environment for various purposes or functions, such as traffic monitoring, traffic analysis, debugging or troubleshooting, accounting, billing, etc.

DETAILED DESCRIPTION

Figure 1:
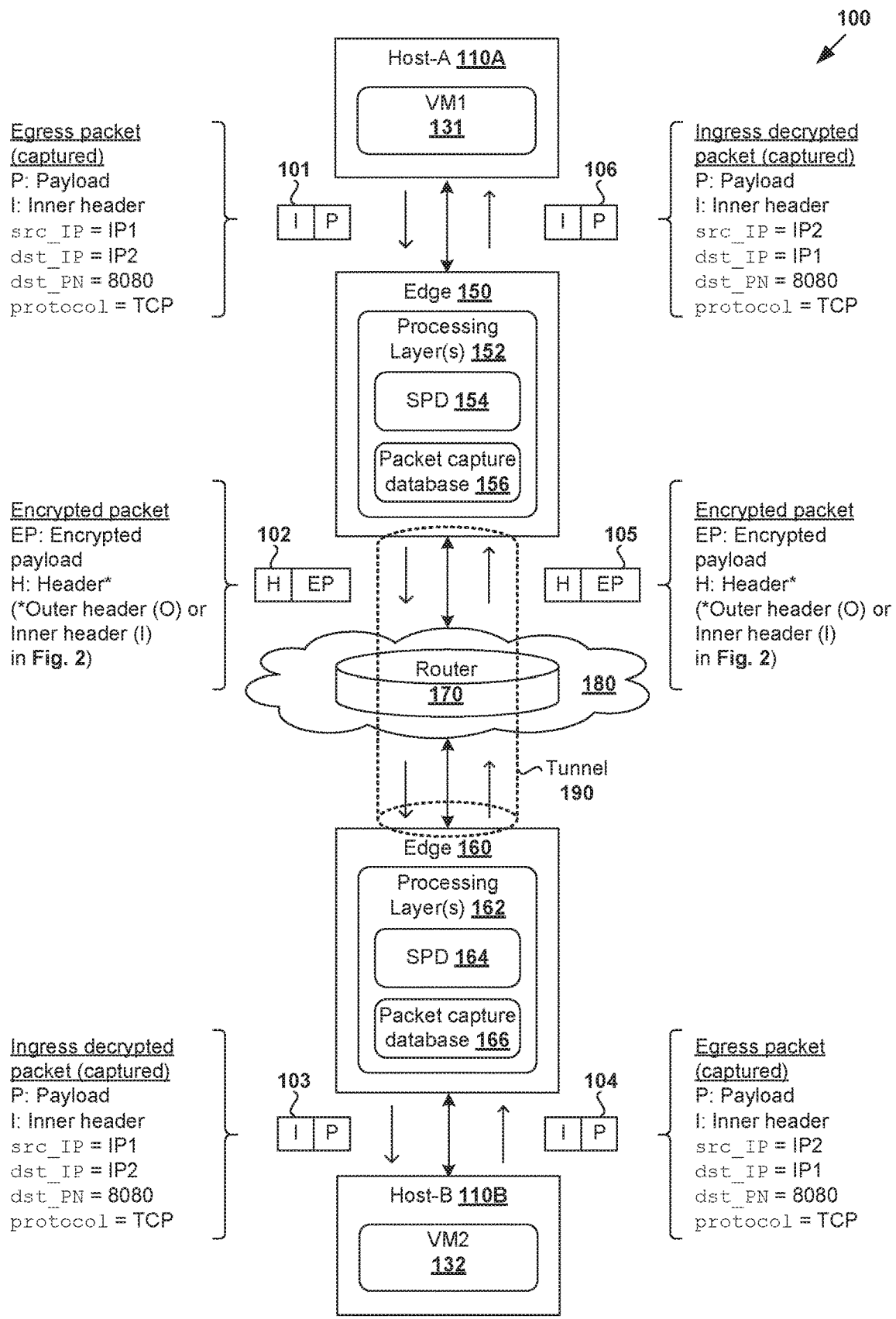
FIG. 1 is a schematic diagram illustrating an example software-defined networking (SDN) environment in which packet capture may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 2:
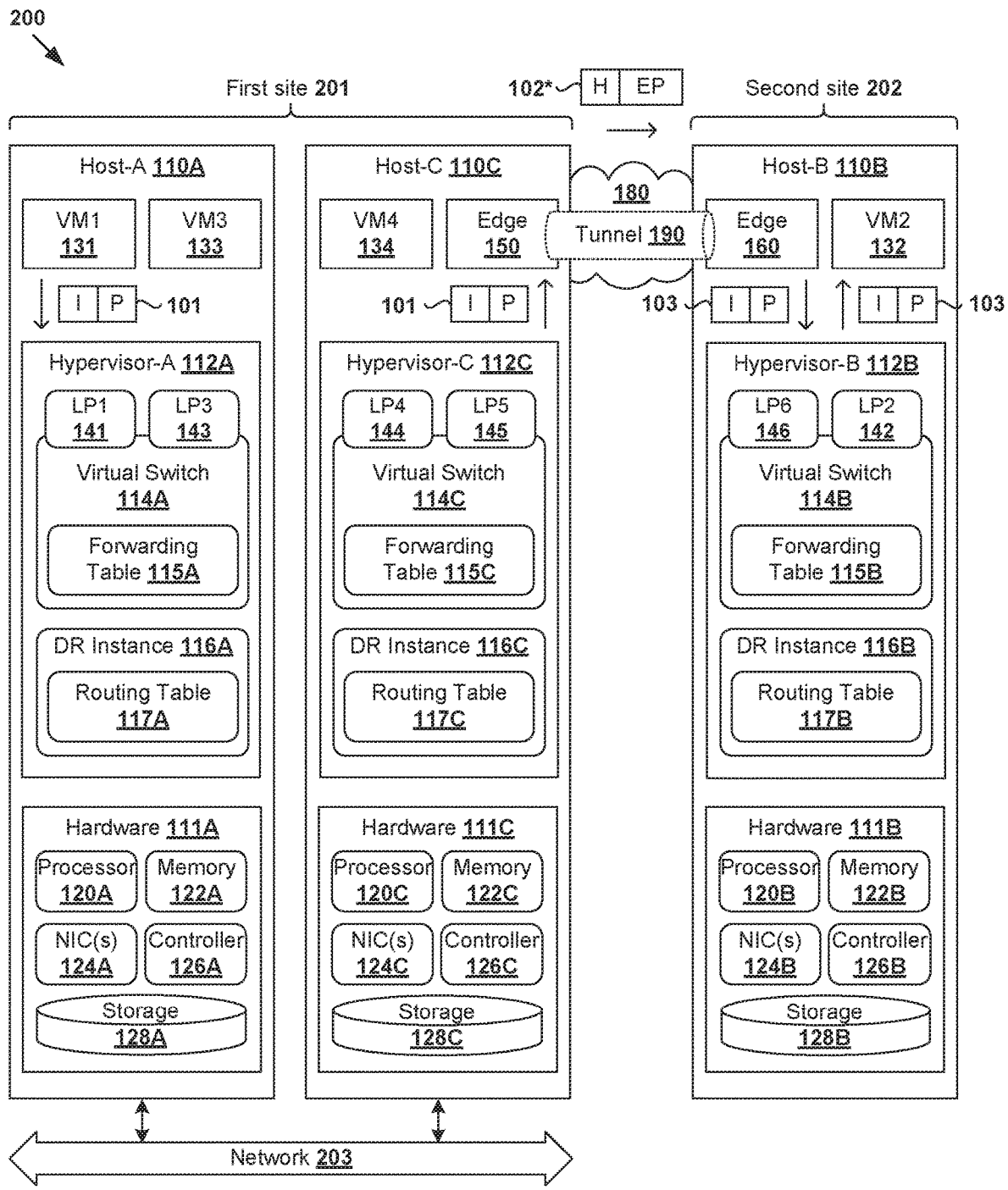
FIG. 2 is a schematic diagram illustrating an example physical view of the SDN environment in FIG. 1.

Challenges relating to packet capture will now be explained using FIG. 1 and FIG. 2. In particular, FIG. 1 is a schematic diagram illustrating example software-defined networking (SDN) environment 100 in which packet capture may be performed. FIG. 2 is a schematic diagram illustrating example physical view 200 of SDN environment 100 in FIG. 1. It should be understood that, depending on the desired implementation, SDN environment 100 may include additional and/or alternative components than that shown in FIG. 1 and FIG. 2. In practice, SDN environment 100 may include any number of hosts (also known as a "computing devices", "host computers", "host devices", "physical servers", "server systems", "transport nodes," etc.). Each host may be supporting any number of virtual machines (e.g., tens or hundreds).

Referring first to FIG. 1, SDN environment 100 includes multiple hosts, such as host-A 110A ("first host") and host-B 110B ("second host") that are connected via a pair of edges ("network devices") 150-160 and physical network 180. In practice, hosts 110A-B may be located at geographically dispersed sites, such host-A 110A at a first site and host-B 110B at a second site. To facilitate communication between hosts 110A-B over physical network 180 (e.g., via router 170), first edge 150 may be deployed at the edge of the first site, and second edge 160 at the edge of the second site. In practice, edge 150/160 may be any suitable network device that is implemented using one or more virtual machines (VMs) and/or physical machines capable of performing functionalities of a switch, router, bridge, gateway, any combination thereof, etc.

Referring also to FIG. 2, first edge 150 and second edge 160 may be VMs supported by respective host-C 110C and host-B 110B. Hosts 110A-C may each include suitable hardware and virtualization software (e.g., hypervisors 112A-C) to support various VMs. For example, at first site 201, host-A 110A supports VM1 131 and VM3 133, and host-C 110C supports first edge 150 and VM4 134. At second site 202, host-B 110B supports VM2 132 and second edge 160. Alternatively, first edge 150 may be supported by the same host as VM1 131, and/or second edge 160 supported by a different host compared to VM2 132. Host-A 110A and host-C 110C may be connected via any suitable physical network 203.

Hypervisor 112A/112B/112C maintains a mapping between underlying hardware 111A/111B/111C and virtual resources allocated to the VMs. Hardware 111A/111B/111C includes various physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications, such as virtual central processing unit (CPU), guest physical memory, virtual disk(s) and virtual network interface controller (VNIC). Hypervisor 112A/112B/112C further implements virtual switch 114A/114B/114C and logical distributed router (DR) instance 116A/116B/116C to handle egress packets from, and ingress packets to, respective VMs.

In practice, logical switches and logical distributed routers may be implemented in a distributed manner and can span multiple hosts 110A-C to connect the VMs. For example, a logical switch may be configured to provide logical layer-2 connectivity to VMs supported by different hosts. The logical switch may be implemented collectively by virtual switches 114A-C of respective hosts 110A-C and represented internally using forwarding tables (e.g., 115A-

C) at the respective virtual switches 114A-C. Further, logical distributed routers that provide logical layer-3 connectivity may be implemented collectively by distributed router (DR) instances (e.g., 116A-C) of respective hosts 110A-C and represented internally using routing tables (e.g., 117A-C) at the respective DR instances. Routing tables 117A-C may be each include entries that collectively implement the respective logical distributed routers.

In the example in FIG. 1 and FIG. 2, edge 150/160 may implement a logical service router (SR), which represents a centralized routing component that is deployed to provide centralized stateful services, such as firewall protection, load balancing, network address translation (NAT), etc. In a data center with multiple tenants requiring isolation from each other, a multi-tier topology may be used. For example, a two-tier topology includes an upper tier associated with a provider logical router (PLR) and a lower tier associated with a tenant logical router (TLR). Each tier may include both DRs and SRs, or DRs and SRs on the upper tier (known as "tier-0") but only DRs at the lower tier (known "tier-1"). The multi-tiered topology enables both the provider (e.g., data center owner) and tenant (e.g., data center tenant) to control their services and policies. Each tenant has full control over its TLR policies, whereas common PLR policies may be applied to different tenants. As such, a logical router may be categorized as one of the following types: TLR-DR, TLR-SR, PLR-DR and PLR-SR.

The VMs may send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches of hosts 110A-C, whereas a "virtual switch" (e.g., 114A-C) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer 4" to a transport layer (e.g., using transmission control protocol (TCP) or user datagram protocol (UDP)) in the Open System Interconnection (OSI) model, although the concepts described herein may be used with other networking models.

Through virtualization of networking services in SDN environment 100, logical overlay networks may be provisioned, changed, stored, deleted and restored programmatically without having to reconfigure the underlying physical hardware architecture. Any suitable protocol(s) may be used to facilitate communication via logical overlay networks, Generic Routing Encapsulation (GRE), Internet Protocol Security (IPSec), Virtual eXtensible Local Area Network (VXLAN), Stateless Transport Tunneling (STT), Virtual Local Area Network (VLAN), Generic Network Virtualization Encapsulation (GENEVE), Network Virtualization using Generic Routing Encapsulation (NVGRE), Layer 2 Tunneling Protocol (L2TP), any combination thereof, etc.

Depending on the desired implementation, first edge 150 and second edge 160 may communicate via a Virtual Private Network (VPN), such as Layer-2 VPN (L2VPN), Layer-3 VPN (L3VPN), etc. In the example in FIG. 1 and FIG. 2, policy-based IPSec VPN may be implemented by establishing tunnel 190 (e.g., GRE-over-IPSec tunnel) to facilitate secure communication between first edge 150 and second edge 160 over physical network 180. GRE is a tunneling protocol that enables the encapsulation of an arbitrary network layer protocol (i.e., payload protocol) by another arbitrary network layer protocol (i.e., delivery protocol). IPSec facilitates secure communication over GRE tunnels. One example service in the IPSec suite is Encapsulating Security Payload (ESP), which provides origin authenticity through source authentication, data integrity through hash functions and confidentiality through encryption protection for IP packets. Another example is Authentication Header (AH) that provides authentication, integrity and anti-replay for packets. Although examples will be discussed using GRE and IPSec with ESP below, it should be understood that any alternative and/or additional protocol(s) may be used.

In practice, packet capture may be performed in SDN environment 100 to capture traffic sent over tunnel 190. However, conventional approaches may only be suitable for capturing encrypted packets that have been processed based on security policies. For some users (e.g., network administrators, security engineers), it is desirable to capture clear traffic (i.e., unencrypted) going through tunnel 190 for various functions, such as traffic monitoring, traffic analysis, debugging or troubleshooting, accounting, billing, etc. Otherwise, tunnel 190 appears as a black box for these users, which is undesirable and makes it challenging to implement the functions described.

Clear Packet Capture

According to examples of the present disclosure, clear packet capture may be implemented in SDN environment 100 using a network device (e.g., first edge 150 or second edge 150) to capture packets in an unencrypted form. Examples of the present disclosure may be implemented in a policy-based VPN (e.g., policy-based IPSec VPN in the example in FIG. 2) that applies security policies to packets travelling over tunnel 190. In the following, various examples of egress (i.e., outbound) packet capture and ingress (i.e., inbound) packet capture will be explained using edge 150/160 as example "network devices"; VM1 131 as an example "first node" or "first virtualized computing instance" located at first site 201; VM2 132 as an example "second node" or "second virtualized computing instance" located at second site 202, etc.

Figure 3:
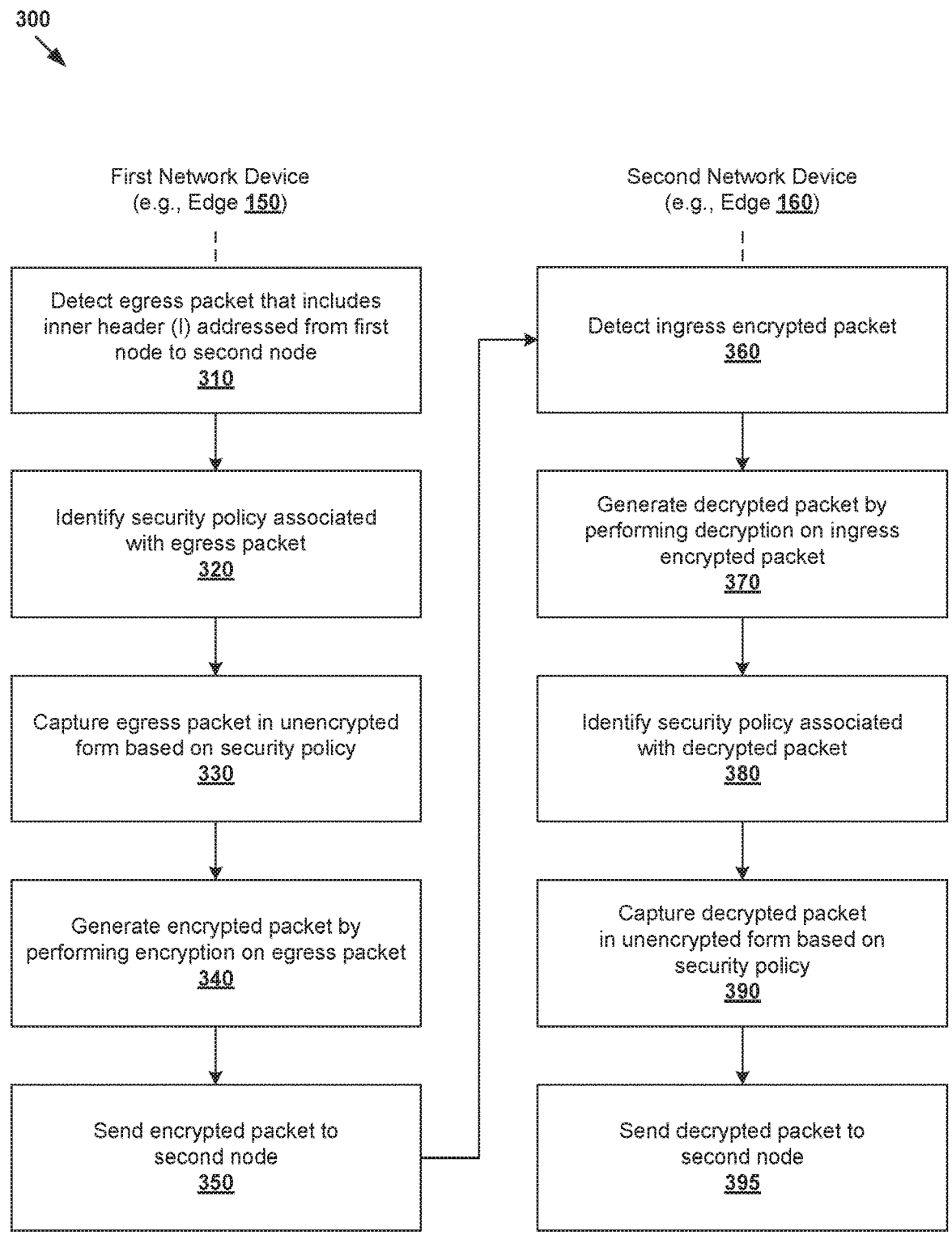
FIG. 3 is a flowchart of an example process for a network device to perform packet capture in an SDN environment.

In more detail, FIG. 3 is a flowchart of example process 300 for a network device to perform packet capture in SDN environment 100. Example process 300 may include one or more operations, functions, or actions illustrated by one or more blocks, such as 310 to 395. The various blocks may be combined into fewer blocks, divided into additional blocks, eliminated and/or rearranged in a different order depending on the desired implementation. Examples of the present disclosure may be implemented by edge 150/160 using any suitable component(s), such as processing layer(s) 152/162, etc.

(a) Egress Packet Capture

At 310 in FIG. 3, first edge 150 detects an egress packet from VM1 131. The egress packet includes a payload (P) and an inner header (I) addressed from VM1 131 associated with a first inner address (e.g., IP1) to VM2 132 associated with a second inner address (e.g., IP2). VM1 131 communicates with VM2 132 via first edge 150. See example egress packet 101 in FIG. 1 and FIG. 2.

At 320 in FIG. 3, first edge 150 identifies a security policy applicable to egress packet by comparing field(s) in the inner header (I) with match field(s) specified by the security policy. At 330 in FIG. 3, based on the security policy, first edge 150 captures the egress packet in an unencrypted form. As will be described using FIG. 4 and FIG. 5, block 330 may include identifying a logical interface (e.g., internal IPSec tunnel interface) associated with the security policy, and forwarding the egress packet via the logical interface to capture the egress packet. First edge 150 may maintain security policies in security policy database (SPD) 154, and store captured packets and collected in packet capture database 156.

At 340 and 350 in FIG. 3, first edge 150 generates and sends an encrypted packet to VM2 132 by performing encryption on the egress packet. See example encrypted packet 102 in FIG. 1 that includes a header (H) and an encrypted payload (EP). The encrypted payload (EP) includes egress packet 101 in an encrypted form. In practice, it should be noted that examples of the present disclosure are applicable to any suitable mode of a policy-based VPN technology, such as tunnel mode and transport mode of IPSec. Two examples are shown in FIG. 2.

In a tunnel mode example in FIG. 2, encrypted packet 102 in FIG. 1 may include a header (H) in the form of an outer header (O), and an encrypted payload (EP). The outer header (O) may be addressed from a first tunnel address (e.g., IP-T1) associated with first edge 150 to a second tunnel address (e.g., IP-T2) associated with second edge 160. Using GRE-over-IPSec as an example, the outer header (O) may include an outer IP header and ESP header, while the encrypted payload (EP) includes an initialization vector (IV) associated with an encryption algorithm, a GRE header, egress packet 101 and an ESP trailer. ESP authentication data may also be appended to encrypted packet 102. Alternatively, using a transport mode, encrypted packet 102 in FIG. 1 may include a header (H) in the form of the inner header (I) of egress packet 101, and an encrypted payload (EP) that includes an IV, an ESP header, payload (P) of egress packet 101, and an ESP trailer. Although various examples will be discussed using the tunnel mode, it should be understood that the transport mode or any alternative mode may be implemented in practice.

(b) Ingress Packet Capture

At 360 in FIG. 3, second edge 150 detects an ingress encrypted packet (see 102 in FIG. 1 and FIG. 2) that includes an outer header (O) and an encrypted payload (EP). At 370 in FIG. 3, second edge 150 performs decryption on ingress encrypted packet 102 to generate an ingress decrypted packet (see 103 in FIG. 1 and FIG. 2) that includes an inner header (I) addressed from VM1 131 to VM2 132. Note that decrypted packet 103 is the same as egress packet 101, both being in an unencrypted form.

At 380, 390 and 395 in FIG. 3, second edge 150 identifies a security policy applicable to decrypted packet 103, captures decrypted packet 103 in an unencrypted form based on the security policy before forwarding or sending decrypted packet 103 to VM2 132. Once received by VM2 132, the processing of decrypted packet 103 may continue at VM2 132 using any suitable approach. As will be described further using FIG. 6 and FIG. 7, block 390 may include identifying a logical interface (e.g., internal IPSec tunnel interface) associated with the security policy, and forwarding decrypted packet 103 via the logical interface to capture the egress packet. Second edge 160 may maintain security policies in SPD 164, and store captured packets in packet capture database 166.

In practice, it should be understood that second edge 160 may also be configured to perform egress packet capture (see 310-350), and first edge 150 to perform ingress packet capture (see 360-395). For completeness, FIG. 1 shows another example where VM2 132 sends packets to VM1 131. In this case, in response to detecting egress packet 104, second edge 160 may capture egress packet 104 in an unencrypted form before performing encryption to generate and send encrypted packet 105. In response to detecting (ingress) encrypted packet 105, first edge 150 may capture decrypted packet 106 in an unencrypted form after performing decryption.

In the following, various examples of egress packet capture will be explained using FIG. 4 and FIG. 5, and ingress packet capture using FIG. 6 and FIG. 7. Throughout the present disclosure, the term "unencrypted form" is used broadly to include a "clear" or "plaintext" form of a packet, which should be contrasted against the "encrypted form" or "ciphertext" form.

Example Egress Packet Capture

Example egress packet capture will be explained using FIG. 4 and FIG. 5. In particular, FIG. 4 is a flowchart of example detailed process 400 for a network device to perform egress packet capture in SDN environment 100. Example process 400 may include one or more operations, functions, or actions illustrated by one or more blocks, such as 410 to 470. The various blocks may be combined into fewer blocks, divided into additional blocks, eliminated and/or rearranged depending on the desired implementation. Example process 400 may be performed by first edge 150 using any suitable component(s), such as processing layer(s) 152. FIG. 5 is a schematic diagram illustrating example egress packet capture in SDN environment 100.

Figure 4:
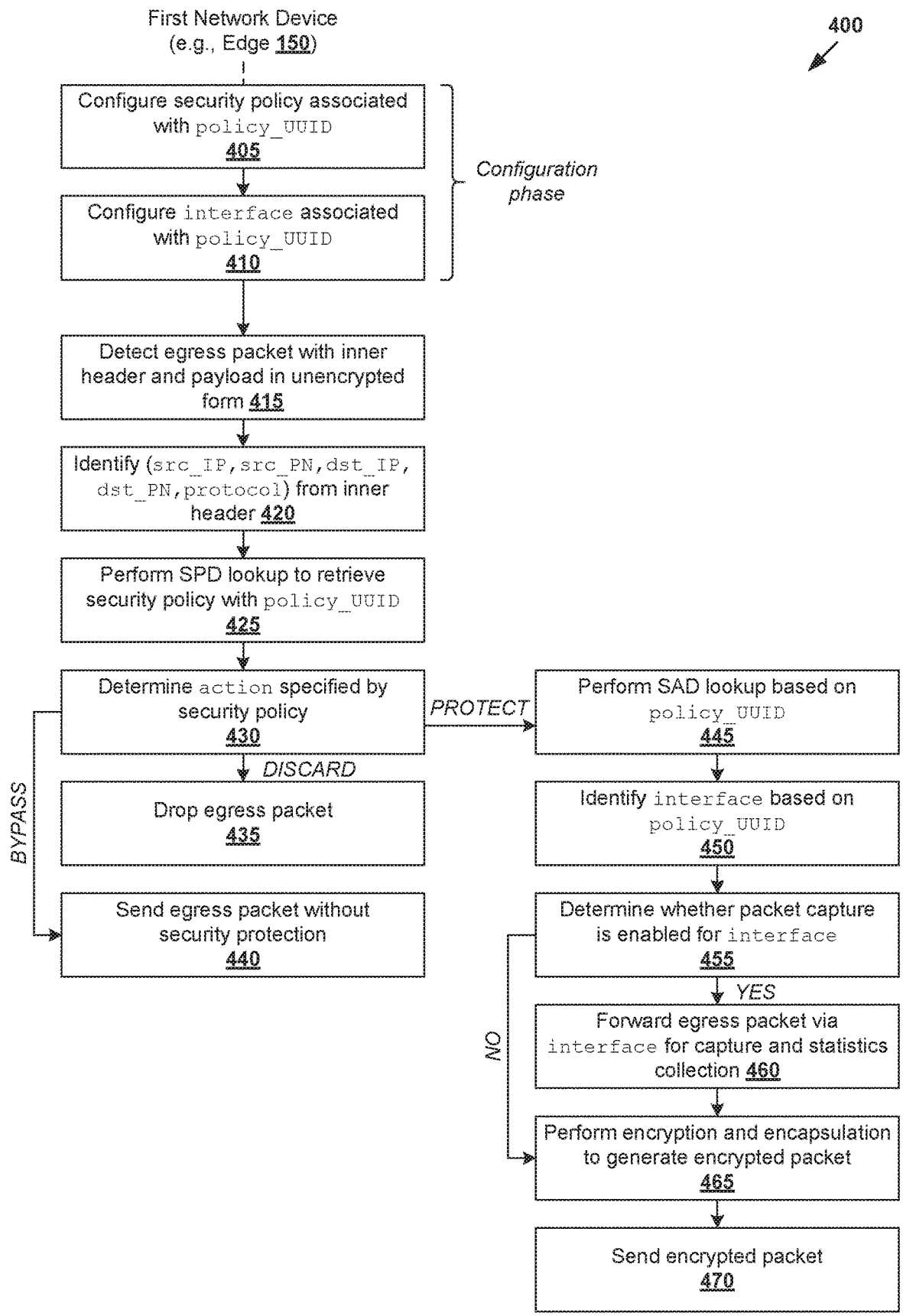
FIG. 4 is a schematic diagram illustrating an example detailed process of egress packet capture in an SDN environment.

At 405 and 410 in FIG. 4, first edge 150 configures a security policy, and a tunnel interface associated with the security policy. Here, the term "associated with" is used broadly to an interface that is configured to capture packets having header fields matching with the match fields of a security policy. Depending on the desired implementation, first edge 150 may perform the configuration based on instructions from management entity or entities (not shown for simplicity), such as SDN manager, SDN controller, etc. One example of an SDN controller is the NSX controller component of VMware NSX® (available from VMware, Inc.) that resides on a central control plane and configurable using SDN manager 180. One example of an SDN manager is the NSX manager component that provides an interface for end users to perform any suitable configuration in SDN environment 100.

In practice, a user (e.g., network administrator) may initiate the configuration of the security policy and/or tunnel interface via any suitable interface provided by the SDN manager, such as graphical user interface, command-line interface, Application Programming Interface (API) calls. In response to the user's configuration, the SDN manager may push the security policy to first edge 150 via the SDN controller. In this case, first edge 150 configures the security policy and tunnel interface based on configuration information received from the SDN controller.

(a) Security Policies

Figure 5:
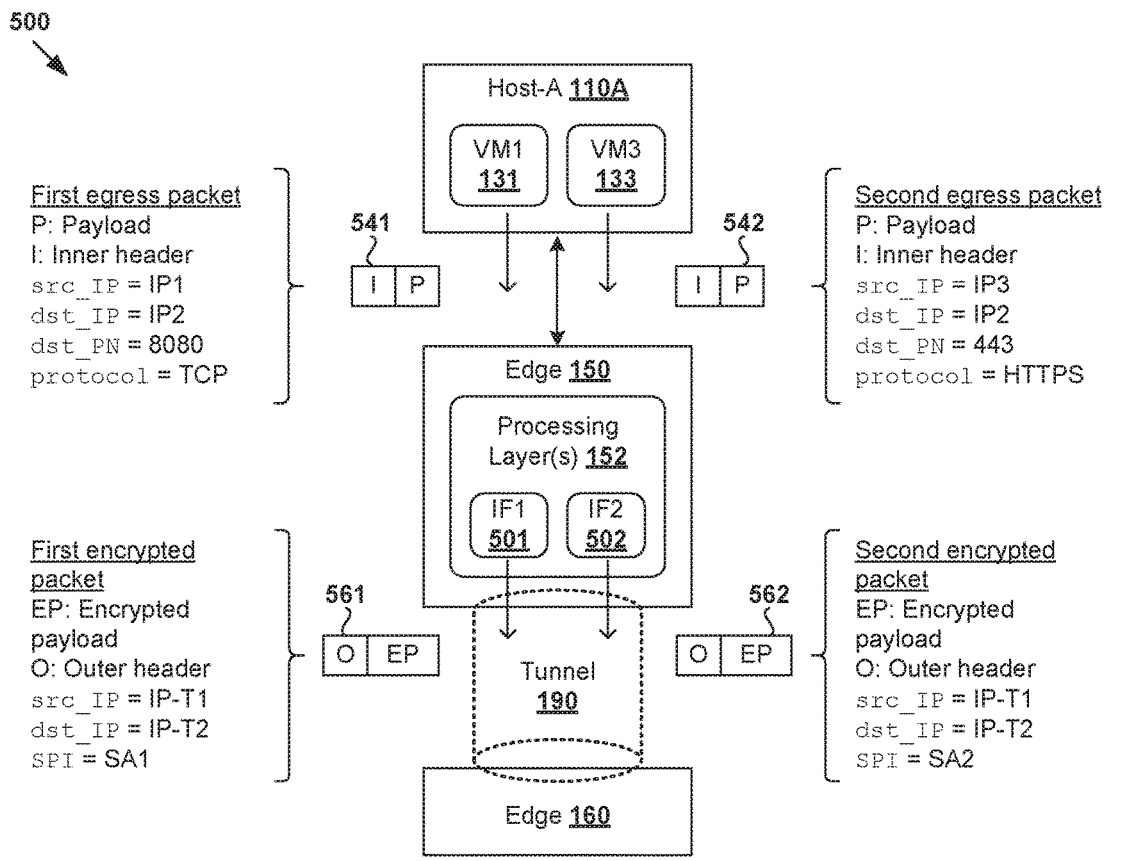
FIG. 5 is a schematic diagram illustrating an example egress packet capture in an SDN environment.
Figure 5:
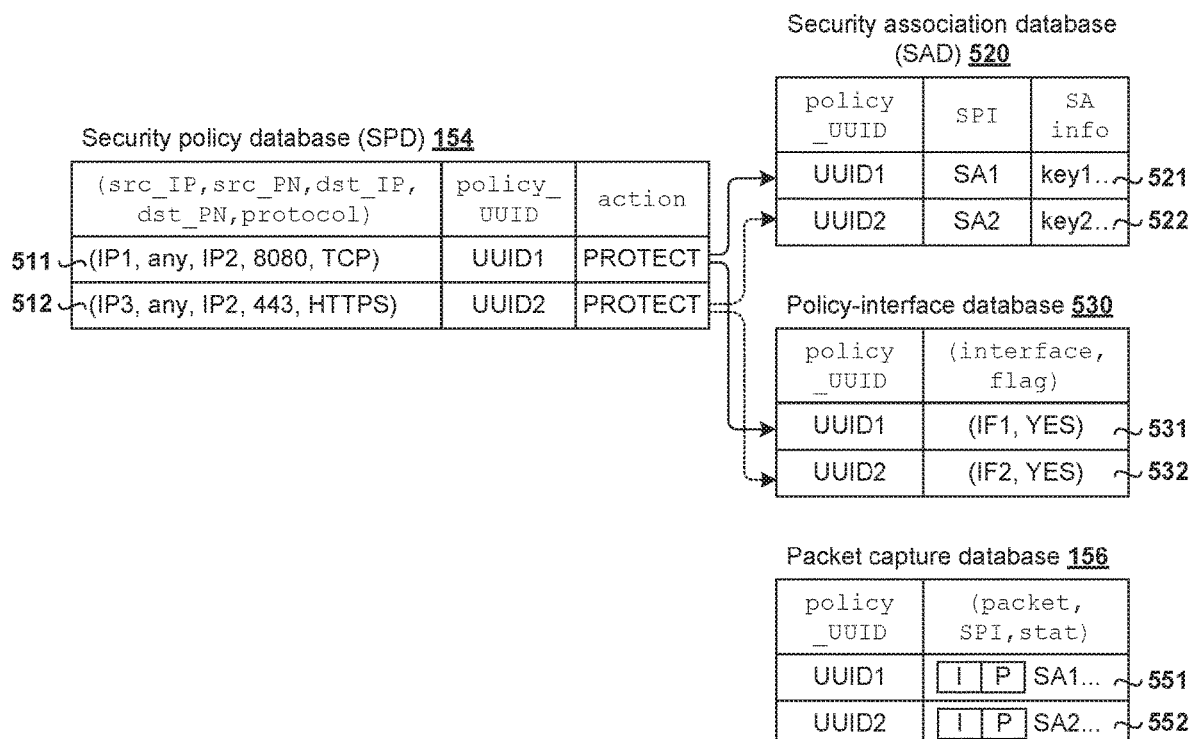

Referring also to FIG. 5, block 405 may include updating SPD 154 that maintains all security policies enforceable by first edge 150. Each entry in SPD 154 may specify any suitable fields, such as match fields (also called traffic selectors), an action, a security policy identifier, direction (e.g., egress, ingress or both), priority, applied to field, etc. For simplicity, not all fields shown in FIG. 5. The match fields may include transport layer information and/or network layer information that is extractable from a packet, such as five-tuples that include source IP address, source port number (PN), destination IP address, destination PN and protocol (e.g., TCP, UDP, HyperText Transfer Protocol Secure (HTTPS), etc.). The "policy identifier" or "policy_UUID" field specifies a universally unique identifier (UUID) associated with the security policy. The "action" field specifies how to handle the packet, such as DISCARD (i.e., drop), PROTECT (i.e., security protection using IPSec), or BYPASS (i.e., no security protection).

In the example in FIG. 5, two example security policies 511-512 are shown. First security policy 511 is configured for communication between source=VM1 131 (i.e., IP address=IP1) and destination=VM2 132 (i.e., IP address=IP2). First security policy 511 specifies match fields that include (source IP=IP1, source PN=any, destination IP=IP2, destination PN=8080, protocol=TCP), action=PROTECT and policy_UUID=UUID1. Second security policy 512 is configured for communication between source=VM3 133 (i.e., IP address=IP3) and destination=VM2 132. Second security policy 512 specifies match fields that include (source IP=IP3, source PN=any, destination IP=IP2, destination PN=443, protocol=HTTPS), action=PROTECT and policy_UUID=UUID2.

(b) Security Associations (SAs)

First edge 150 also maintains security association database (SAD) 520 that is linked to SPD 154. In particular, each entry in SAD 520 stores information associated with an SA that represents a "connection" that affords security services to packets carried by the SA. Each SA is associated with a security parameter index (SPI), a destination IP address, and a security service (e.g., AH or ESP for IPSec). The SPI is a 32-bit value selected by a receiver (e.g., second edge 160) to uniquely identify an SA, and used by a sender (e.g., first edge 150) to perform decryption.

When first edge 150 wishes to send an egress packet to a destination via second edge 160 with security protection (e.g., IPSec), first edge 150 performs an SPD lookup to determine whether there is a corresponding SA established. If none has been established, first edge 150 initiates an SA establishment (e.g., using IKE) to negotiate the relevant security parameters. In the example in FIG. 5, first security policy 511 in SPD 154 is mapped to first SA 521 associated with (SPI=SA1, outer destination IP=IP-T2, service=ESP) in SAD 520 (see full line from 511 to 521). Second security policy 512 is mapped to second SA 522 associated with (SPI=SA2, destination IP=IP-T2, service=ESP) in SAD 520 (see dotted line from 512 to 522).

Each SA 521/522 is further associated with security parameters (not shown in detail in FIG. 5 for simplicity) that are negotiated between first edge 150 and second edge 160 using any suitable key management protocol, such as Internet Key Exchange (IKE), etc. Example security parameters include sequence number counter, sequence counter overflow flag, anti-replay window, AH or ESP information (e.g., encryption and/or integrity algorithm, key information, etc.), lifetime, IPSec mode flag (e.g., tunnel or transport), path maximum transmission unit (PMTU), any combination thereof, etc. For example in FIG. 5, "key1" and/or "key2" (see 521-522) may be used for any suitable cipher, such as Data Encryption Standard (DES), Triple-DES, International Data Encryption Algorithm (IDEA), etc.

(c) Tunnel Interfaces

Based on security policies 511-512, first edge 150 configures two tunnel interfaces labelled "IF1" and "IF2" (see 501 and 502) to facilitate packet capture. In practice, tunnel interfaces 501-502 may be internal interfaces that are used internally by first edge 150 for packet capture purposes, and not exposed or visible to any components external to first edge 150. In practice, tunnel interfaces 501-502 may be logical interfaces configured on first edge 150, such as logical switch ports, logical router ports, etc.

First edge 150 may maintain policy-interface database 530 to store mapping information between a security policy and a tunnel interface. Each entry in policy-interface database 530 may specify an identifier (i.e., policy_UUID) associated with a security policy, an identifier of a tunnel interface associated with the security policy, and a flag (i.e., YES or NO) to selectively enable or disable packet capture on the interface. For example, first security policy 511 in SPD 154 is mapped to first tunnel interface "IF1" 501 based on first mapping information=(UUID1, IF1, YES) at 531 in FIG. 5. Second security policy 512 in SPD 154 is mapped to second tunnel interface "IF2" 502 based on second mapping information=(UUID2, IF1, YES) at 532 in FIG. 5.

Although one-to-one mappings are shown in FIG. 5 (and FIG. 7 to be explained below), it should be understood that any alternative approach may be used, such as a many-to-one mapping that maps multiple security policies to a particular tunnel interface, etc. Also, it should be understood that an entry in SPD 154 may be mapped to multiple (e.g., two) SAs in SAD 520. In practice, there are two types of SA: egress (outbound) or ingress (inbound). If a security policy entry in SPD 154 is applicable to one direction=egress (or ingress), the entry will be mapped to one egress (or ingress) SA in SAD 520. If the direction=both egress and ingress, the security policy will be mapped to two SAs in SAD 520 (i.e., one egress SA and one ingress SA for the communication between a pair of nodes). In this case, two SAs in SAD 520 are associated with one tunnel interface and corresponding security policy, thereby merging two SAs into one abstraction.

In practice, any suitable data structure(s) may be used to implement SPD 154, SAD 520 and policy-interface database 530. For example, SPD 154 may be a hash table indexed by 5-tuples (source IP, source PN, destination IP, destination PN, protocol). Similarly, policy-interface database 530 may be a hash table indexed by policy_UUID; SAD 520 indexed by triplet (SPI, destination IP, security protocol), packet capture database 156 (to be discussed further below) indexed by policy_UUID. Hash tables may also be used in the example in FIG. 7.

(c) Packet Detection

At 415 in FIG. 4, first edge 150 detects first egress packet 541 that is addressed from VM1 131 to VM2 132. In particular, egress packet 541 is in an unencrypted form, and includes an inner header (I) and a payload (P). The inner header (I) is addressed from source IP address=IP1 associated with VM1 131 to destination IP address=IP2 associated with VM2 132.

At 420 and 425 in FIG. 4, in response to detecting first egress packet 541, first edge 150 performs an SPD lookup to retrieve security policy 511 with policy_UUID=UUID1 that is applicable to first egress packet 541. This may involve comparing inner header fields in first egress packet 541 against traffic selectors or match fields (source IP=IP1, source PN=any, destination IP=IP2, destination PN=8080, protocol=TCP). If there is no matching security policy is found, first egress packet 541 will be dropped.

At 430 in FIG. 4, first edge 150 determines an action specified by first security policy 511. There are several possible outcomes. If action=DISCARD, the packet will be dropped (see 435). If action=BYPASS, the packet will be forwarded to the destination without any security protection (see 440). Since first security policy 511 specifies action=PROTECT, first edge 150 proceeds to block 445.

At 445 in FIG. 4, in response to determination that first security policy 511 specifies action=PROTECT, first edge 150 proceeds to perform an SAD lookup to identify first SA 521 based on policy_UUID=UUID1 associated with first security policy 511. As explained using block 405, security policy 511 is mapped (e.g., via a pointer) to first SA 521 associated with (SPI=SA1, outer destination IP=IP-T2, service=ESP).

(d) Packet Capture

At 450 in FIG. 4, first edge 150 identifies first tunnel interface "IF1" 501 based on policy_UUID=UUID1 associated with first security policy 511 based on first mapping information 531=(UUID1, IF1, YES) in policy-interface database 530. In the example in FIG. 5, tunnel interface "IF1" 501 may be identified based on a pointer that maps first security policy 511 to first mapping information 531. Alternatively, since first SA 521 is also associated with first security policy 511, first tunnel interface "IF1" 501 may be identified based on a mapping (e.g., a pointer) between first SA 521 and first mapping information 531.

At 455 in FIG. 4, first edge 150 performs a span check to determine whether packet capture is enabled for first tunnel interface "IF1" 501 based on first mapping information 531. If flag=NO, first edge 150 proceeds to block 465 that will be discussed below. Otherwise (YES), at 460 in FIG. 4, first edge 150 sends or forwards first egress packet 541 via interface "IF1" 501 to capture first egress packet 541 and collect statistics associated with first egress packet 541 and/or first security policy 511. First egress packet 541 is captured in an unencrypted form (i.e., before encryption).

First egress packet 541 and statistics captured at block 460 may be stored in packet capture database 156 in association with policy_UUID=UUID1. For example, first entry 551 may store an identifier of first tunnel interface "IF1" 501, a copy or sample of first egress packet 541, statistics, etc. Depending on the desired implementation, first entry 551 may also store SA-related information, such as SPI=SA1 associated with first SA 521, etc. Any suitable statistics may be collected, such as number of packets to which first security policy 511 and first SA 521 are applicable, an analysis of the content of first egress packet 541, etc.

Any suitable approach may be used for packet capture, such as writing or forwarding egress packet 541 to a kernel NIC interface (KNI) where a tool (e.g., tcpdump is listening) may be used to capture first egress packet 541, etc. In practice, KNI is a tool provided by Data Path Development Kit (DPDK®) available from The Linux Foundation) to allow userspace applications to exchange packets with a kernel networking stack. KNI may represent a kernel counterpart of tunnel interface 501/502 that is created when a packet capture session is established.

According to examples of the present disclosure, a userspace application implemented by first edge 150 (e.g., processing layer(s) 152) may use any suitable tool (e.g., tcpdump/libpcap) to copy the content of first egress packet 541 travelling on a datapath on which first tunnel interface "IF1" 501 is located. This way, it is not necessary to modify the kernel on first edge 150 to implement clear packet capture. Any alternative and/or additional tool(s) may be used, such as the pdump tool provided by the DPDK Packet Capture Framework to capture packets in the userspace, etc.

(e) Encryption and Encapsulation

At 465 and 470 in FIG. 4, first edge 150 generates and sends first encrypted packet 561 to VM2 132 via second edge 160 over tunnel 190. In particular, first edge 150 performs encryption and encapsulation to generate first encrypted packet 561 that includes an outer header (O), and an encrypted payload (EP) that includes an encrypted form of egress packet 541. Note that encryption and encapsulation may be performed in any suitable order. First encrypted packet 561 is sent to over tunnel 190 to second edge 160, which may perform ingress packet capture according to the examples in FIGS. 6-7.

Using GRE-over-IPSec described using FIG. 2, the outer header (O) of first encrypted packet 561 may include an outer IP header and an ESP header. The outer IP header may be addressed from a first outer tunnel address (e.g., IP-T1) associated with first edge 150 to a second outer tunnel address (e.g., IP-T2) associated with second edge 160. The ESP header may include SPI=SA1 associated with first SA 521. The encrypted payload (EP) may include an encrypted form of an IV, a GRE header, first egress packet 541, and an ESP trailer. The GRE header may be addressed from a first GRE tunnel address (e.g., IP-G1) to a second GRE tunnel address (e.g., IP-G2). ESP authentication data is also appended.

In another example, blocks 415-470 may be repeated for capturing second egress packet 542 with an inner header (I) addressed from VM3 133 and VM2 132, and a payload (P). In this case, based on fields in second egress packet 542, second security policy 512, second SA 522 and second tunnel interface "IF2" 502 may be identified using SPD 154, SAD 520 and policy-interface database 530. This way, second tunnel interface "IF2" 502 may be used to capture second egress packet 542 and collect statistics associated with second security policy 512. See also second entry 552 stored in packet capture database 156.

After encryption and encapsulation, second encrypted packet 562 includes an outer header (O), and an encrypted payload (EP) that includes an encrypted form of second egress packet 542. Similarly, the outer header may include an ESP header that identifies SPI=SA2 associated with second SA 522. Second encrypted packet 562 is then sent to over tunnel 190 to second edge 160, which may perform ingress packet capture according to the examples in FIGS. 6-7.

Example Ingress Packet Capture

Example ingress packet capture will be explained using FIG. 6 and FIG. 7. In particular, FIG. 6 is a flowchart of example detailed process 600 for a network device to perform ingress packet capture in SDN environment 100. Example process 600 may include one or more operations, functions, or actions illustrated by one or more blocks, such as 610 to 650. The various blocks may be combined into fewer blocks, divided into additional blocks, eliminated, and/or rearranged in a different order depending on the desired implementation. Example process 600 may be performed by second edge 160 using processing layer(s) 162. FIG. 7 is a schematic diagram illustrating example ingress packet capture in SDN environment 100.

(a) Security Policies and SAs

Figure 6:
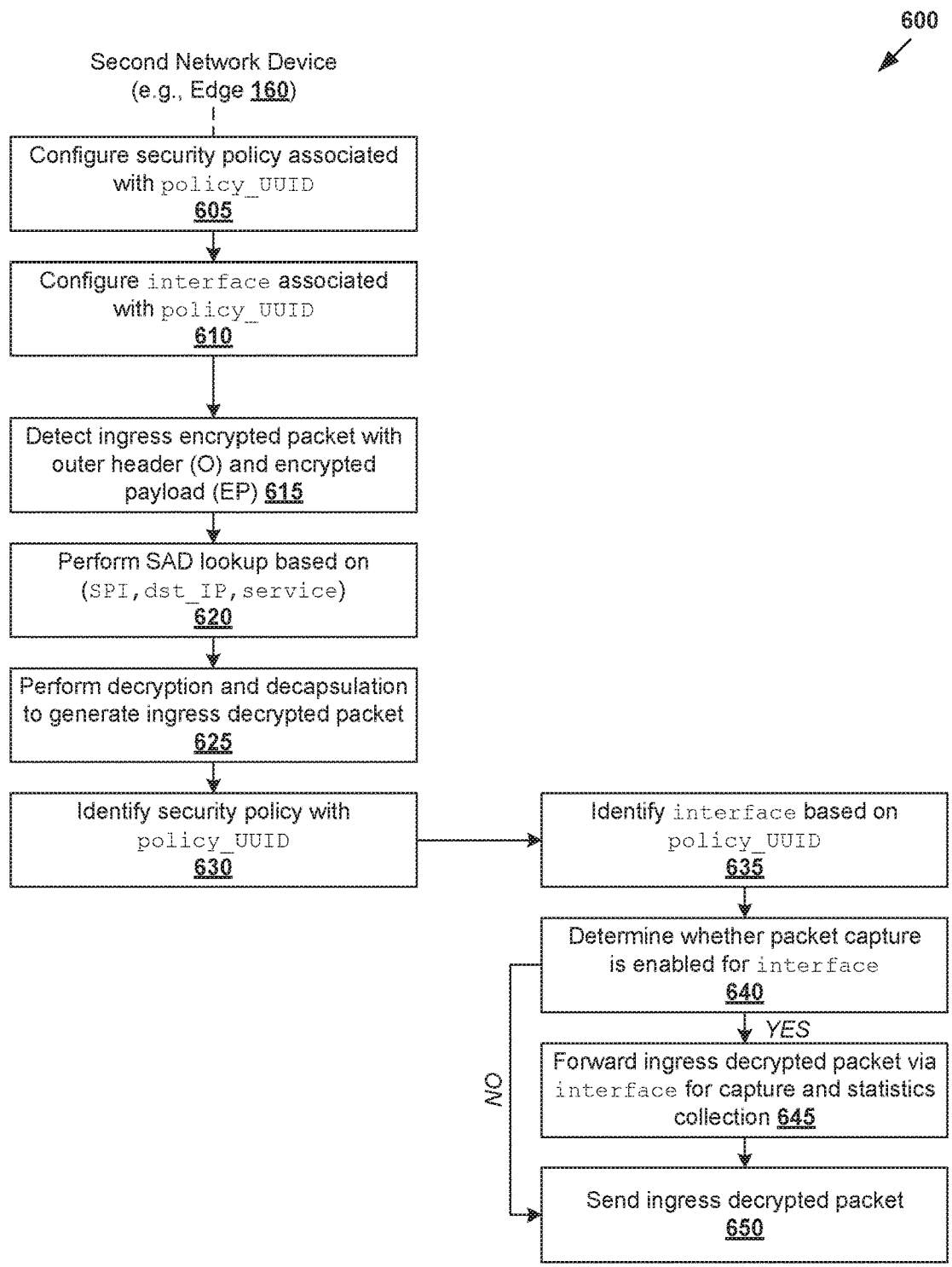
FIG. 6 is a schematic diagram illustrating an example detailed process of ingress packet capture in an SDN environment.
Figure 7:
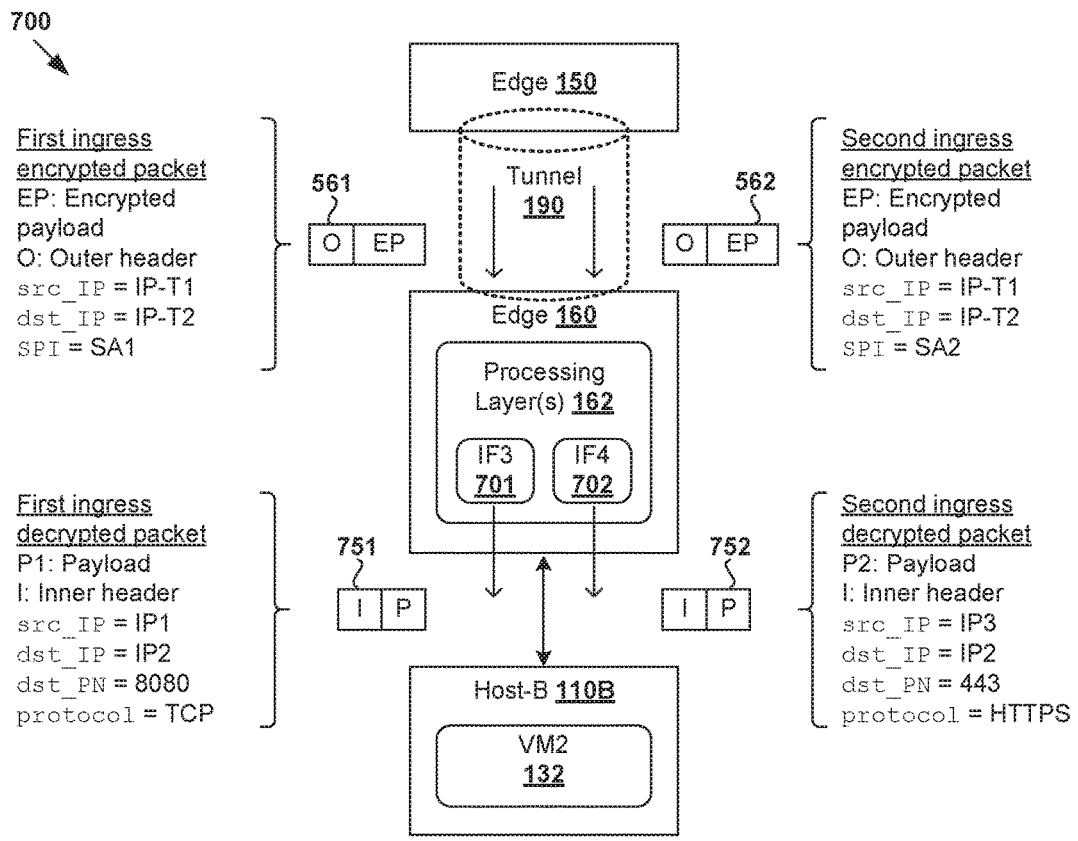
FIG. 7 is a schematic diagram illustrating an example ingress packet capture in an SDN environment.

At 605 and 610 in FIG. 6, second edge 160 configures a security policy, and a tunnel interface associated with the security policy, such as based on configuration information or instructions from SDN manager, SDN controller, etc. Block 605 may include updating SPD 164 that maintains all security policies enforceable by second edge 160. In FIG. 7, SPD 164 includes two example security policies 711-712 (related to 511-512 in FIG. 5). First security policy 711 specifies match fields (source IP=IP1, source PN=any, destination IP=IP2, destination PN=8080, protocol=TCP), action=PROTECT and policy_UUID=UUID1. Second security policy 712 specifies match fields that include (source IP=IP3, source PN=any, destination IP=IP2, destination PN=643, protocol=HTTPS), action=PROTECT and policy_UUID=UUID2.

Second edge 160 also maintains SAD 720 that is linked to SPD 164. In the example in FIG. 7, first security policy 711 in SPD 164 is mapped to first SA 721 associated with (SPI=SA1, outer destination IP=IP-T2, service=ESP) in SAD 720 (see full line from 711 to 721). Second security policy 712 is mapped to second SA 722 associated with (SPI=SA2, outer destination IP=IP-T2, service=ESP) in SAD 720 (see dotted line from 712 to 722). In the example in FIG. 7, SAD 720 also stores the policy_UUID of security policy 711/712 associated with SA 721/722 to improve ingress packet processing (as will be explained using 630 below). Each SA 721/722 is associated with security parameters (not shown in detail in FIG. 7 for simplicity) that are negotiated between first edge 150 and second edge 160. Example security parameters have been discussed using FIG. 5, and not repeated here for brevity.

(b) Tunnel Interfaces

Based on security policies 711-712, second edge 160 configures two tunnel interfaces labelled "IF3" and "IF4" (see 701 and 702) to facilitate packet capture. Similar to the examples in FIG. 5, tunnel interfaces 701-702 may be "internal" logical interfaces configured on second edge 160, such as logical switch ports, logical router ports, etc. Policy-interface database 730 is configured to store mapping information between a security policy and a tunnel interface. For example, first security policy 711 in SPD 164 is mapped to first tunnel interface "IF3" 701 according to first mapping information=(UUID1, IF3, YES); see 731 in FIG. 7. Second security policy 712 in SPD 164 is mapped to second tunnel interface "IF4" 702 according to second mapping information=(UUID2, IF3, YES); see 732.

(c) Packet Detection

At 615 in FIG. 6, second edge 160 detects first (ingress) encrypted packet 561 that is sent by first edge 150 over tunnel 190. As explained using FIG. 5, first encrypted packet 561 includes an outer header (O) and an encrypted payload (EP). Using GRE-over-IPSec in FIG. 2 as an example, the outer header (O) may include an outer IP header and an ESP header that specifies SPI=SA1. The encrypted payload (EP) includes an encrypted form of first egress packet 541 sent by VM1 131.

(d) Decapsulation and Decryption

At 620 in FIG. 6, in response to detecting first encrypted packet 561, second edge 160 performs an SAD lookup to identify first SA 721 based on (SA1, IP-T2, ESP). At 625 in FIG. 6, second edge 160 performs decapsulation and decryption based on security parameters that are associated with first SA 721 in SAD 720. In particular, decapsulation is performed to remove the outer header (O) and decryption is performed to generate (i.e., reconstruct) first ingress decrypted packet 751 in an unencrypted form. Other headers (e.g., IV, GRE header) are also removed during decapsulation. Note that decapsulation and decryption may be performed in any suitable order.

At 630 in FIG. 6, second edge 160 identifies a policy_UUID=UUID1 of first security policy 711 associated with first SA 721. In the example in FIG. 7, SAD 720 stores the policy_UUIDs of respective security policies 711-712. Based policy_UUID=UUID1, second edge 160 may identify first security policy 711. This way, it is not necessary to implement a costly SPD lookup to map first SA 721 to first security policy 711. Depending on the desired implementation, second edge 160 may verify whether the required security protection (e.g., IPSec) has been provided based on first SA 721.

(e) Packet Capture

At 635 in FIG. 6, second edge 160 identifies first tunnel interface "IF3" 701 associated with first security policy 711 based on first mapping information 731=(UUID1, IF3, YES) in policy-interface database 730. Tunnel interface "IF3" 701 may be identified based on a pointer that maps first security policy 711 to first mapping information 731. Alternatively, since first SA 721 is also associated with first security policy 711, first tunnel interface "IF1" 701 may be identified based on a mapping (e.g., a pointer) between first SA 721 and first mapping information 731.

At 640 in FIG. 6, second edge 160 performs a span check to determine whether packet capture is enabled for first tunnel interface "IF3" 701 (see "YES" in entry 731). If flag=NO, second edge 160 proceeds to block 650. Otherwise (YES), at 645 in FIG. 6, second edge 160 sends or forwards first decrypted packet 751 via interface "IF3" 701 to capture first decrypted packet 751 and statistics associated with first security policy 711. Any suitable packet capture approach may be used, such as writing to a KNI where tcpdump is listening, etc. The KNI may be configured or created for first tunnel interface "IF3" 701 at block 610.

First decrypted packet 751 and statistics obtained at block 645 may be stored in packet capture database 166 in association with policy_UUID=UUID1. For example, first entry 741 may store an identifier of first tunnel interface "IF3" 701, a copy or sample of first decrypted packet 751, statistics, etc. Depending on the desired implementation, first entry 741 may also store SA-related information, such as SPI=SA1 associated with first SA 721, etc. Any suitable statistics may be collected, such as number of packets to which first security policy 711 and first SA 721 are applicable, an analysis of etc. At 650 in FIG. 6, second edge 160 sends first decrypted packet 751 to destination VM2 132. First decrypted packet 751, which is in an encrypted form, is the same as first egress packet 541 sent by VM1 131.

In another example, blocks 605-650 may be repeated for capturing second encrypted packet 562. Based on (SA2, IP-T2, ESP) in the outer header (O), second SA 722 may be identified using an SAD lookup. Decapsulation and decryption are then performed to generate second (ingress) decrypted packet 752 that includes an inner header (I) addressed from VM3 133 and VM2 132. Based on second SA 722 in SAD 720, second security policy 712, second SA 722 and second tunnel interface "IF4" 702 may be identified using SPD 164, SAD 720 and policy-interface database 730. This way, second tunnel interface "IF4" 702 may be used to capture second ingress packet 752 and statistics associated with second security policy 712. See also second entry 742 in packet capture database 166. After the packet capture, second decrypted packet 752 is sent to destination VM2 132 on host-B 110B.

Lifecycle Management

Figure 8:
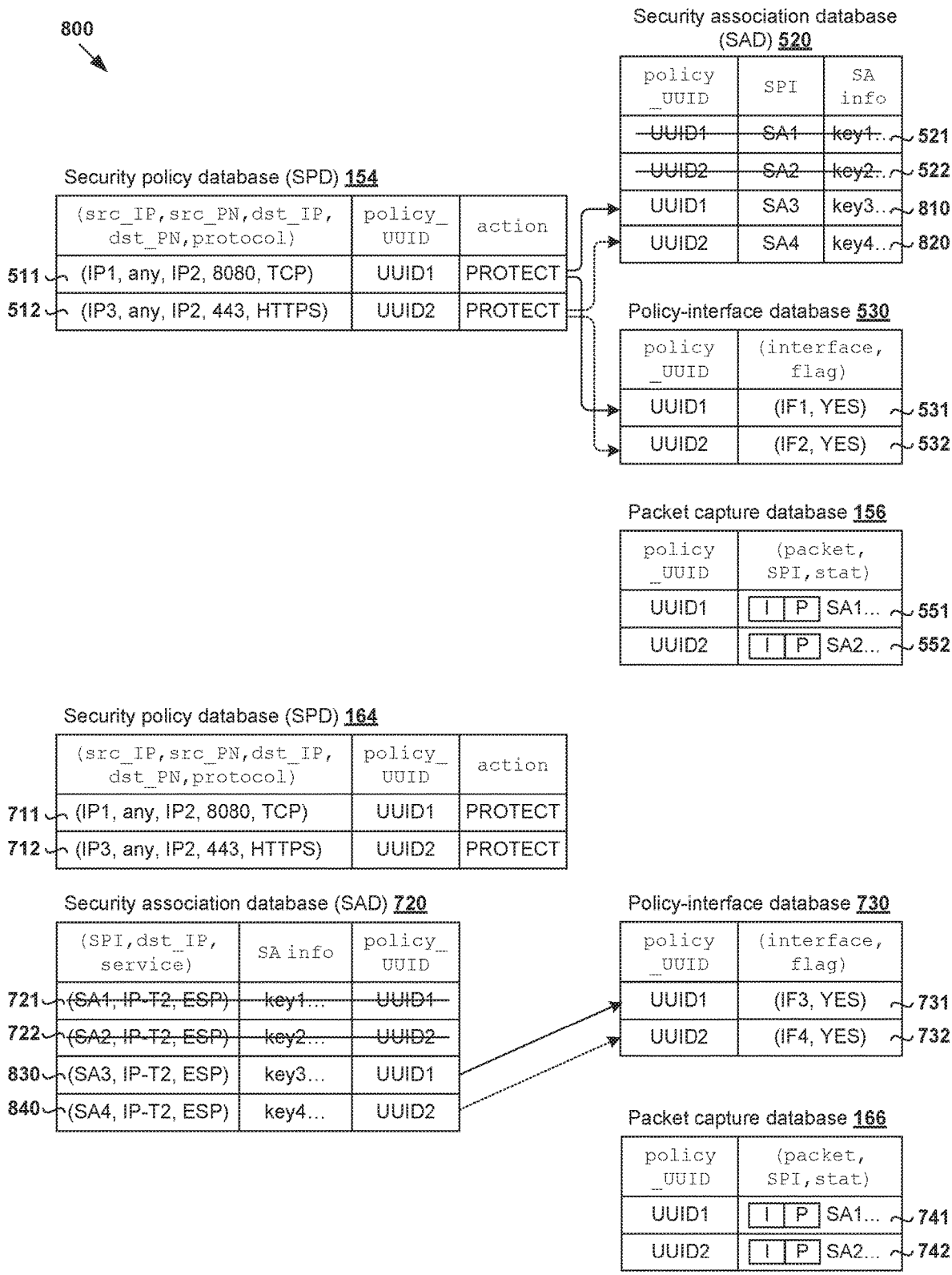
FIG. 8 is a schematic diagram illustrating example statistics persistency in an SDN environment.

According to examples of the present disclosure, packets and statistics stored in packet capture database 156/166 may persist as long as security policies in SPD 154/164 are maintained (and their respective UUIDs do not change). This way, information persistency may be achieved, such as in the event of an SA rekey, etc. Some examples are shown in FIG. 8, which is a schematic diagram illustrating example statistics persistency 800 in SDN environment 100. In practice, an SA may be rekeyed when a new SA is created to replace an old one. When SA1 521 and SA2 522 in FIG. 5 are rekeyed and therefore replaced by respective SA3 810 and SA4 820 in FIG. 8, packets and statistics captured using tunnel interfaces 501-502 may be retained in packet capture database 156 at first edge 150. Similarly, when SA1 721 and SA2 722 in FIG. 7 are replaced by respective SA3 830 and SA4 840 in FIG. 8, packets and statistics captured using tunnel interfaces 701-702 may be retained in packet capture database 166 at second edge 160. This way, all captured packets and SA-related statistics associated with a particular policy_UUID may be stored in a persistent and contiguous manner. Depending on the desired implementation, tunnel interface 501/502/701/702 may be removed when associated security policy 511/512/711/712 is removed, or security protection (e.g., using IPSec) is disabled.

Container Implementation

Although discussed using VMs 131-134, it should be understood that packet capture may be performed for other virtualized computing instances, such as containers, etc. The term "container" (also known as "container instance") is used generally to describe an application that is encrypted with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 11 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. Using the examples in FIGS. 1-7, packet capture may be performed for containers in SDN environment 100.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of acting as a host may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network device to perform packet capture in a software-defined networking (SDN) environment that includes the network device, a first node, and a second node, the method comprising:

detecting an egress packet that includes an inner header addressed from the first node to the second node, wherein the first node communicates with the second node via the network device in the SDN environment;

identifying a security policy applicable to the egress packet by comparing one or more fields in the inner header with one or more match fields specified by the security policy;

after identifying the security policy, based on the one or more match fields specified by the security policy, capturing the egress packet, by the network device, in an unencrypted form;

performing encryption on the egress packet to generate an encrypted packet that includes the egress packet in an encrypted form; and sending the encrypted packet to the second node.

2. The method of claim 1, wherein capturing the egress packet comprises:

identifying, from multiple logical interfaces configured on the network device, a particular logical interface associated with the security policy; and forwarding the egress packet via the particular logical interface to capture the egress packet.

3. The method of claim 2, wherein capturing the egress packet comprises:

capturing the egress packet in response to determination that packet capture is enabled on the logical interface.

4. The method of claim 2, further comprising:

prior to detecting the egress packet, configuring multiple security policies that include the security policy, and the multiple logical interfaces which are associated with the respective multiple security policies.

5. The method of claim 1, wherein capturing the egress packet comprises:

storing, in a packet capture database, content of the egress packet in association with an identifier of the security policy.

6. The method of claim 5, wherein capturing the egress packet comprises:

collecting statistics associated with the egress packet or the security policy; and storing, in the packet capture database, the statistics in association with the identifier of the security policy.

7. The method of claim 1, wherein the inner header includes a first inner header, and wherein the method further comprises:

detecting an ingress encrypted packet;

performing decryption on the ingress encrypted packet to generate a decrypted packet that includes a second inner header addressed from the second node to the first node;

based on the security policy, capturing the decrypted packet in an unencrypted form; and sending the decrypted packet to the first node.

8. A network device configured to perform packet capture in a software-defined networking (SDN) environment that includes the network device, an intermediate device, a first node, and a second node, the network device comprising:

a processor; and a non-transitory computer-readable medium having stored thereon instructions that, in response to execution by the processor, cause the processor to:

detect an egress packet that includes an inner header addressed from the first node to the second node, wherein the first node communicates with the second node via the network device in the SDN environment;

identify a security policy applicable to the egress packet by comparing one or more fields in the inner header with one or more match fields specified by the security policy;

after identifying the security policy, based on the one or more match fields specified by the security policy, capture the egress packet, by the network device, in an unencrypted form;

perform encryption on the egress packet to generate an encrypted packet that includes the egress packet in an encrypted form; and send the encrypted packet to the second node.

9. The network device of claim 8, wherein the instructions that cause the processor to capture the egress packet cause the processor to:

identify, from multiple logical interfaces configured on the network device, a particular logical interface associated with the security policy; and forward the egress packet via the particular logical interface to capture the egress packet.

10. The network device of claim 9, wherein the instructions that cause the processor to capture the egress packet cause the processor to:

capture the egress packet in response to determination that packet capture is enabled on the logical interface.

11. The network device of claim 9, wherein the instructions further cause the processor to:

prior to detection of the egress packet, configure multiple security policies that include the security policy, and the multiple logical interfaces which are associated with the respective multiple security policies.

12. The network device of claim 8, wherein the instructions that cause the processor to capture the egress packet cause the processor to:

store, in a packet capture database, content of the egress packet in association with an identifier of the security policy.

13. The network device of claim 12, wherein the instructions that cause the processor to capture the egress packet cause the processor to:

collect statistics associated with the egress packet or the security policy; and store, in the packet capture database, the statistics in association with the identifier of the security policy.

14. The network device of claim 8, wherein the inner header comprises a first inner header, and wherein the instructions further cause the processor to:

detect an ingress encrypted packet;

perform decryption on the ingress encrypted packet to generate a decrypted packet that includes a second inner header addressed from the second node to the first node;

based on the security policy, capture the decrypted packet in an unencrypted form; and send the decrypted packet to the first node.

15. A non-transitory computer-readable storage medium that includes a set of instructions which, in response to execution by a processor of a network device, cause the processor to perform a method of packet capture in a software-defined networking (SDN) environment that includes the network device, a first node, and a second node, wherein the method comprises:

detecting an ingress encrypted packet;

performing decryption on the ingress encrypted packet to generate a decrypted packet that includes an inner header addressed from the first node to the second node, wherein the first node communicates with the second node via the network device in the SDN environment;

identifying a security policy applicable to the decrypted packet;

after identifying the security policy, based on one or more match fields specified by the security policy, capturing the decrypted packet, by the network device, in an unencrypted form; and sending the decrypted packet to the second node.

16. The non-transitory computer-readable storage medium of claim 15, wherein capturing the decrypted packet comprises:

identifying, from multiple logical interfaces configured on the network device, a particular logical interface associated with the security policy; and forwarding the decrypted packet via the particular logical interface to capture the decrypted packet.

17. The non-transitory computer-readable storage medium of claim 16, wherein capturing the decrypted packet comprises:

capturing the decrypted packet in response to determination that packet capture is enabled on the particular logical interface.

18. The non-transitory computer-readable storage medium of claim 16, wherein the method further comprises:

prior to detecting the ingress encrypted packet, configuring multiple security policies that include the security policy, and the multiple logical interfaces which are associated with the respective multiple security policies.

19. The non-transitory computer-readable storage medium of claim 15, wherein capturing the decrypted packet comprises:

storing, in a packet capture database, content of the decrypted packet in association with an identifier of the security policy.

20. The non-transitory computer-readable storage medium of claim 19, wherein capturing the decrypted packet comprises:

collecting statistics associated with the decrypted packet or the security policy; and storing, in the packet capture database, the statistics in association with the identifier of the security policy.

21. The non-transitory computer-readable storage medium of claim 15, wherein the inner header includes a first inner header, and wherein the method further comprises:

detecting an egress packet that includes a second inner header that is addressed from the second node to the first node;

based on the security policy, capturing the egress packet in an unencrypted form;

performing encryption on the egress packet to generate an egress encrypted packet that includes the egress packet in an encrypted form; and sending the egress encrypted packet to the first node.

* * * * *